(12) United States Patent
Haner et al.

(10) Patent No.: US 9,050,918 B2
(45) Date of Patent: Jun. 9, 2015

(54) VEHICLE SEAT BELT RETENTION APPARATUS AND METHOD

(75) Inventors: Markus Haner, Rothenstadt (DE); Dirk Kaessner, Kummersbruck (DE)

(73) Assignee: Grammer AG, Amberg (DE)

( * ) Notice: Subject to any disclaimer, the term of this patent is extended or adjusted under 35 U.S.C. 154(b) by 343 days.

(21) Appl. No.: 13/403,562

(22) Filed: Feb. 23, 2012

(65) Prior Publication Data

US 2012/0217776 A1  Aug. 30, 2012

(30) Foreign Application Priority Data

Feb. 25, 2011 (DE) .................. 10 2011 012 461

(51) Int. Cl.
- *B60N 2/427* (2006.01)
- *B60R 22/00* (2006.01)
- *B60N 2/68* (2006.01)
- *B60R 22/12* (2006.01)
- *B60R 22/18* (2006.01)
- *B60R 21/055* (2006.01)

(52) U.S. Cl.
CPC ............... *B60N 2/688* (2013.01); *B60R 22/12* (2013.01); *B60N 2/42709* (2013.01); *B60R 22/18* (2013.01); *B60R 21/055* (2013.01); *B60R 2022/1818* (2013.01)

(58) Field of Classification Search
CPC .... B60N 2/42709; B60N 2/688; B60R 22/12; B60R 22/26; B60R 22/18; B60R 21/055; B60R 2022/1818

USPC .............................. 297/471, 216.13, 472, 483
See application file for complete search history.

(56) References Cited

U.S. PATENT DOCUMENTS

| | | | | | |
|---|---|---|---|---|---|
| 3,938,627 | A | * | 2/1976 | Nagazumi | 188/371 |
| 3,973,650 | A | * | 8/1976 | Nagazumi | 188/371 |
| 4,138,157 | A | * | 2/1979 | Pickett et al. | 297/472 |
| 4,904,023 | A | * | 2/1990 | Fohl | 297/472 |
| 5,468,053 | A | * | 11/1995 | Thompson et al. | 297/472 |
| 5,580,091 | A | * | 12/1996 | Doty | 280/805 |
| 5,733,013 | A | * | 3/1998 | Brown | 297/483 |
| 5,791,687 | A | * | 8/1998 | Gotou et al. | 280/805 |
| 5,823,627 | A | * | 10/1998 | Viano et al. | 297/471 |
| 6,145,881 | A | * | 11/2000 | Miller et al. | 280/806 |
| 7,137,648 | B2 | * | 11/2006 | Schulz et al. | 280/805 |

FOREIGN PATENT DOCUMENTS

DE      10251081      5/2004

* cited by examiner

*Primary Examiner* — Milton Nelson, Jr.
(74) *Attorney, Agent, or Firm* — Lowe Graham Jones PLLC

(57) ABSTRACT

An integrated belt retention apparatus for use with a vehicle seat having a seat part with a backrest and with a belt retention apparatus integrated with the vehicle seat, comprising a belt suspension having a fastener for fastening to the backrest, wherein the vehicle seat is characterized in that the fastener comprises a crash element with a deformation region for reducing kinetic energy in the event of activation of the belt retention apparatus as a result of an accident.

9 Claims, 2 Drawing Sheets

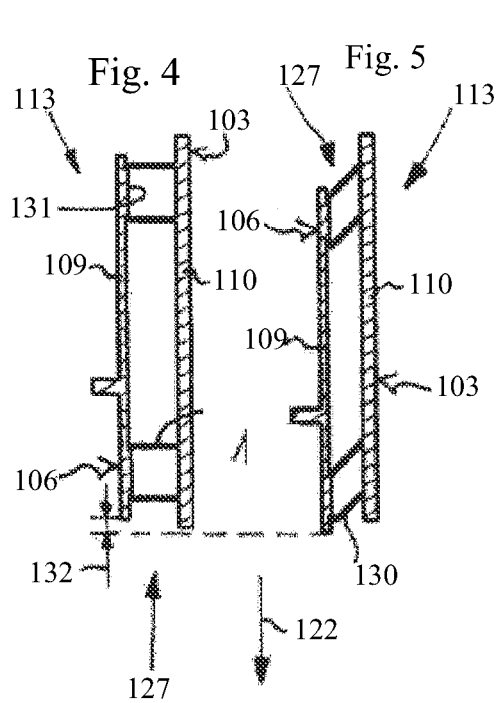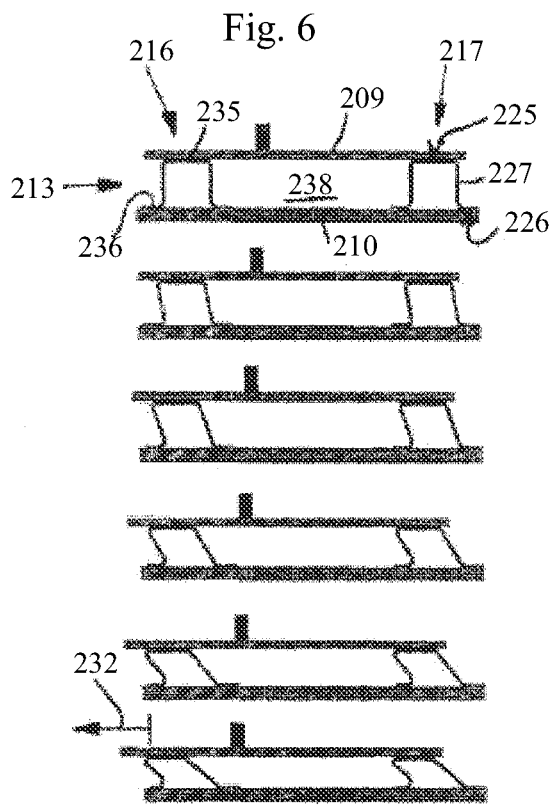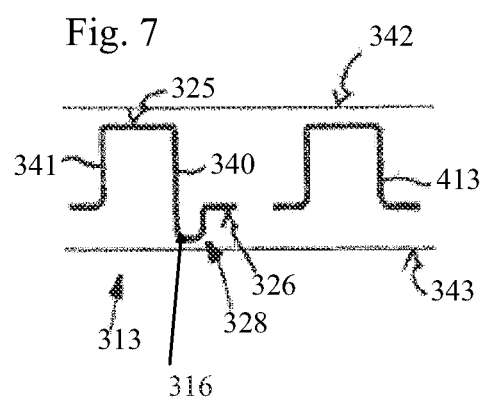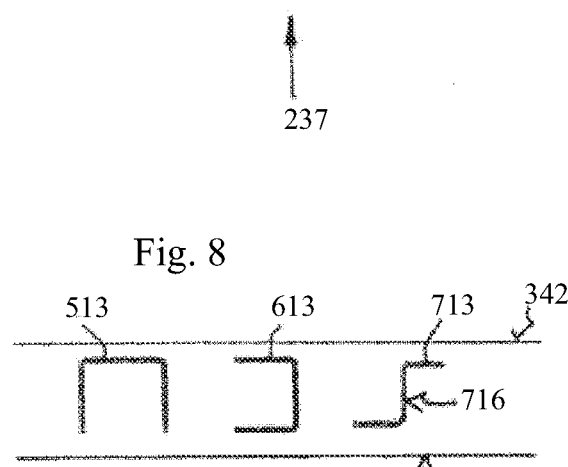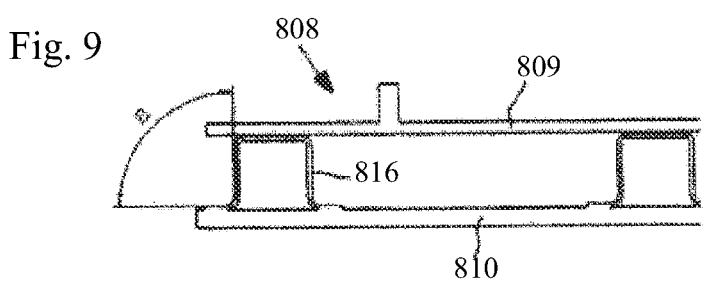

VEHICLE SEAT BELT RETENTION APPARATUS AND METHOD

PRIORITY CLAIM

This application claims the benefit of German Application Serial No. 102011012461.6 filed on Feb. 25, 2011, contents of which are incorporated herein.

FIELD OF THE INVENTION

The invention relates on the one hand to a vehicle seat with a seat part, with a backrest and with a belt retention apparatus integrated on the vehicle seat and comprising a belt suspension means, in which the belt suspension means has a fastening means for fastening to the backrest.

The invention relates on the other hand to a vehicle seat with a seat part, with a backrest and with a belt retention apparatus integrated on the vehicle seat and comprising a belt suspension means, in which an adjustment mechanism is arranged between the seat part and the backrest, in which the belt suspension means has a device for mounting on the backrest, and in which the backrest comprises a device for the retention of the mounting device, the mounting device being arranged on the retention device.

In addition, the invention relates to a method of reducing the introduction of forces and/or moments on an adjustment mechanism between a seat part and a backrest of a vehicle seat with an integrated belt retention apparatus, and use related thereto.

BACKGROUND OF THE INVENTION

It is known for a belt retention apparatus for restraining an occupant of a vehicle on a vehicle seat to be integrated directly on or in the vehicle seat. In this case a belt storage means and a device for arresting a belt fitting on a part of the vehicle seat and a belt reversal device is arranged on a backrest of the vehicle seat by means of a possibly vertically adjustable belt suspension means. In this respect it is readily possible in structural terms to be able to produce a vehicle seat with an integrated vehicle occupant protection independently of other features of the bodywork. A drawback in this case, however, is that in the event of a vehicle crash relatively high retention forces are introduced into the backrest of the vehicle seat by means of the belt suspension means. These forces can frequently amount to a multiple of the body weight of the vehicle occupant strapped on the vehicle seat. This leads among other things to an enormous and usually abrupt loading of the adjustment mechanism, by means of which the backrest is fastened to the seat part. It happens not infrequently that the adjustment mechanism is irreparably damaged and has to be replaced.

SUMMARY OF THE INVENTION

The present invention is directed to remedy the drawback identified in the background.

In accordance with a first aspect of the invention, the present invention includes a vehicle seat with a seat part, with a backrest and with a belt retention apparatus integrated with the vehicle seat and comprising a belt suspension means, in which the belt suspension means has a fastening means for fastening to the backrest, the vehicle seat being characterized in that the fastening means comprises a crash element with a deformation region for reducing kinetic energy in the event of activation of the belt retention apparatus as a result of an accident.

The loading occurring in the event of a vehicle crash in particular on the adjustment mechanism, by means of which the backrest is fastened to the seat part, can be reduced by means of the fastening means designed according to the invention, in that kinetic energy is reduced by deformation action which has taken place. As a result, an abrupt loading, in particular of the adjustment mechanism, can be prevented or at least mitigated.

The term "crash element" describes a component of a belt retention apparatus which is integrated in a vehicle seat and by means of which a deformation region can be formed which is determined structurally and which can perform a deformation action in a purposeful manner in the event of a vehicle crash.

With a suitable seat structure a deformation region of this type can optionally be formed directly by a sheet metal part of the belt suspension means and/or the backrest.

In a preferred embodiment, the deformation region is designed in the form of an independent component since a greater flexibility of design can be achieved in this way.

A preferred variant of embodiment provides that a direction of main deformation, which is directed essentially in the direction of a longitudinal extension of the backrest, is inherent in the deformation region.

If a deformation of the crash element takes place mainly in the direction of the longitudinal extension of the backrest, in this case a factory-made distance between the belt suspension means and the adjustment mechanism can be additionally reduced, as a result of which a lever path between the belt suspension means and the adjustment mechanism is shortened in an advantageous manner.

An alternative embodiment includes a vehicle seat with a seat part, with a backrest and with a belt retention apparatus integrated on the vehicle seat and comprising a belt suspension means, in which an adjustment mechanism is arranged between the seat part and the backrest, in which the belt suspension means comprises a device for mounting on the backrest and in which the backrest comprises a device for the retention of the mounting device, the mounting device being arranged on the retention device, and the vehicle seat being characterized by a device for shortening a lever path between the belt suspension means and the adjustment mechanism in the event of activation of the belt retention apparatus as a result of an accident.

The device for shortening the lever path can be designed in various ways. It is preferable for it to comprise a crash element with a deformation region to reduce kinetic energy with a direction of main deformation, which is directed essentially in the direction of a longitudinal extension of the backrest.

The term "mounting device" describes a component on the side of the belt suspension means, in particular a component like a metal sheet, by means of which the belt suspension means is capable of being fastened to a backrest structure. In this respect the mounting device can be a component of the belt suspension means.

The term "retention device" describes a component on the side of the backrest, in particular a component like a metal sheet, to which the belt suspension means with its mounting device is fastened. In this respect the retention device can be a component of the backrest structure.

The present invention further describes a method of reducing the introduction of forces and/or moments on an adjustment mechanism between a seat part and a backrest of a vehicle seat with an integrated belt retention apparatus, in which a lever path between a belt suspension means of the belt retention apparatus and the adjustment mechanism is shortened in the event of activation of the belt retention apparatus as a result of an accident.

In an alternative embodiment, the belt suspension means comprises a device for mounting on the backrest and the backrest comprises a device for retaining the mounting device, in which case a crash element capable of being deformed in a resilient or plastic manner substantially in the direction of a longitudinal extension of the backrest is arranged between the mounting device and the retention device.

If the deformation region of the crash element is formed for example not directly by conventional components or groups of components, such as for example the mounting device and/or the retention device of the seat, it is advantageous for the deformation region to be formed by means of a stand-alone crash element which is preferably arranged between the mounting device and the retention device. In this way, use can be made of conventional mounting devices and retention devices in an advantageous manner, as a result of which it would also be optionally possible for older vehicle seats to be converted.

In one embodiment, the mounting device describes for example a sheet metal part of the belt suspension means, which as a rule is welded onto a corresponding sheet metal part of a seat structure in the region of the backrest. Here, the retention device designates the corresponding sheet metal part of the seat structure. In a conventional manner the two sheet metal parts are welded to each other in abutment with each other in order to produce a fixed join. In this case the two sheet metal parts are not movable with respect to each other, unless the join is destroyed. If the mounting device is arranged on the retention device at a distance from the latter, a sufficiently large structural space for a necessary deformation path can be provided in a structurally simple manner.

The crash element can be readily embedded with little effort in a conventional vehicle seat structure using a sheet-like base member with at least one sheet metal rib as well as at least two abutment planes which are at a distance from each other, in which case the at least one sheet metal rib is orientated substantially horizontally. In this respect the sheet metal rib is orientated substantially transversely to the direction of main deformation.

On account of the sheet-like base member, a mechanical safety device which is easy to construct and which operates in a reliable manner can be provided.

In one embodiment, the sheet-like base member can be a stamped part. In this respect the crash element can be produced in an easy and inexpensive manner.

The sheet-like base member can be produced with a thickness of material of between 0.5 mm and 3 mm, depending upon what deformation action is intended to be carried out by the crash element.

The mounting device and the retention device can be spaced sufficiently far from each other without undue effort by means of a sheet metal rib or preferably a plurality of sheet metal ribs.

In an alternative embodiment, the at least one sheet metal rib can be welded to the mounting device on the side of the belt suspension means on the first of the abutment planes and to the retention device on the side of the backrest on the second of the abutment planes. As a result, the present crash element can be produced on a vehicle seat with an integrated belt retention apparatus in a particularly inexpensive manner.

If sheet metal ribs of the crash element are arranged orientated substantially horizontally, the direction of main deformation can be pre-set in an operatively reliable manner in the direction of the longitudinal extension of the backrest, in that the sheet metal ribs of the crash element arranged one behind the other can bend in this direction if the forces acting upon the crash element reach or exceed a critical value as a result of a vehicle crash.

In an alternative embodiment, the deformation path can be varied in a structurally simple manner depending upon the requirement of application, if of the at least one sheet metal rib is at an angle of more than 10°, preferably of more than 20°, and of less than 170°, preferably of less than 160°, and ideally of 90°, with respect to at least one of the abutment planes.

It is preferable for a deformation path of more than 10 mm, preferably of 20 mm or more, to be capable of being achieved by means of the crash element according to the invention. In addition, the parameters of the deformation path can also be influenced by the height of the crash element or of a sheet metal rib thereof. By way of example, the height has a value of between 10 mm and 50 mm. These values, however, are not to be understood as being restrictive in an obligatory manner.

The deformation behaviour of the crash element can be additionally influenced if the sheet-like base member is bent at least once and preferably more than once. In particular, the abutment planes can be chosen to be almost any desired size by bending over ends of the sheet metal rib or ribs in an appropriate manner, as a result of which the crash element can be fastened to the mounting and retention devices over a large area and thus in a particularly intimate manner.

It is preferable for the sheet-like base member to be designed with double webs or with a plurality of webs, i.e. the crash element makes more than one sheet metal rib available. By way of example, two webs or sheet metal ribs of the crash element are arranged at a distance of between 1 mm and 20 mm from each other.

In a simple manner the sheet-like base member can be bent into a U shape and can have two additionally bent fastening plates at its ends.

The two fastening plates can advantageously form two abutment planes on the side of the backrest which are at a distance from each other, whilst the middle arm of the base member bent into a U shape can form a large, advantageously continuous abutment plane on the side of the belt suspension means.

In an alternative embodiment, the crash element includes a store of material for extending a deformation path, the store of material being arranged in particular at least in part behind a plane of the mounting device and/or a plane of the retention device. A store of material of this type can be produced in a very simple manner structurally just by a base member bent into a U shape forming a shorter and a longer web between the mounting device and the retention device. In this case the longer web can extend in an advantageous manner behind the plane of the mounting device and/or a plane of the retention device. It is preferable for the longer web to be made bent once more, so that further material is available for extending the deformation path.

In an alternative embodiment, the present invention incorporated the use of a belt suspension fastening means of a vehicle seat belt retention apparatus for shortening a lever path between the belt suspension means and an adjustment mechanism between a backrest and a part of the vehicle seat in the event of activation of the belt retention apparatus integrated on the vehicle seat as a result of an accident.

It is to be understood that the features of the solutions described above and in the claims respectively can also optionally be combined in order to be able to implement the advantages in a suitably cumulated manner.

BRIEF DESCRIPTION OF THE DRAWINGS

Preferred and alternative examples of the present invention are described in detail below with reference to the following drawings:

FIG. 4 is a diagrammatic view of a further embodiment of the design of a crash element in the original factory-made state;

FIG. 5 is a diagrammatic view of the crash element as shown in FIG. 4 after a deformation action has been carried out;

FIG. 6 is a diagrammatic view of a deformation sequence of another crash element;

FIG. 7 is a diagrammatic view of two sheet-like base members of alternative crash elements;

FIG. 8 is a diagrammatic view of further sheet-like base members of further alternative crash elements, and FIG. 9 shows diagrammatically a further crash element with an angle of the sheet metal rib of 90° indicated.

DETAILED DESCRIPTION OF THE PREFERRED EMBODIMENT

Figure 1:
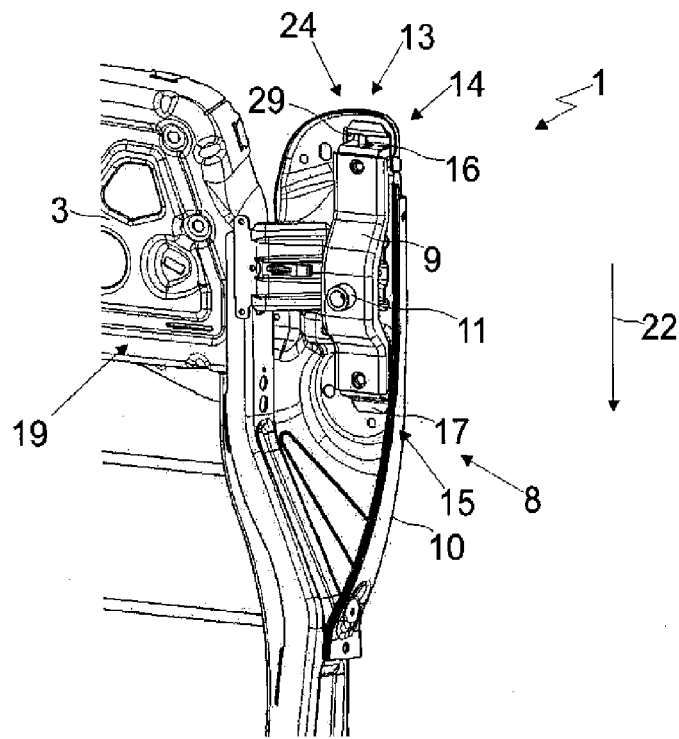
FIG. 1 is a diagrammatic, perspective partial view of a vehicle seat in the region of a belt suspension means with a fastening means comprising a crash element between a mounting device on the side of the belt suspension means and a retention device on the side of the backrest.
Figure 2:
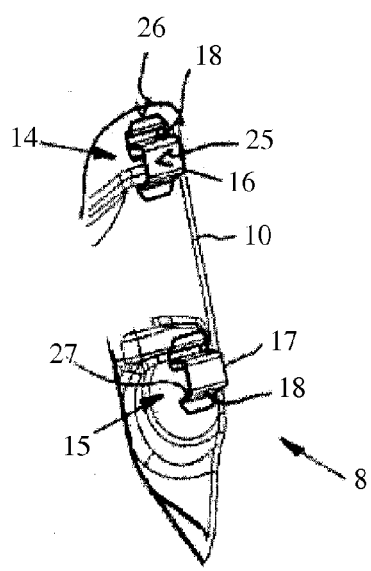
FIG. 2 is a further diagrammatic, perspective partial view of the belt suspension fastening means as shown in FIG. 1, but without a mounting device on the side of the belt suspension means.
Figure 3:
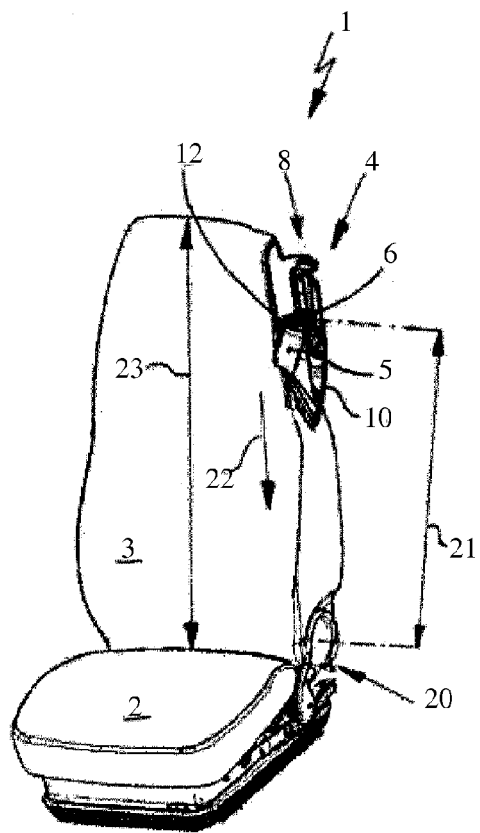
FIG. 3 is a diagrammatic, perspective view of the vehicle seat as shown in FIG. 1.

The vehicle seat 1 shown in FIGS. 1 to 3 has a seat part 2, a backrest 3 and a belt retention apparatus 4 integrated in the vehicle seat 1. The belt retention apparatus 4 is formed in this embodiment by a belt 5 and a belt suspension means 6. It comprises, however, at least one belt store (not shown here) as well as an arresting device (not shown here) for a belt fitting. At the top on the left, as viewed in the direction of the seat, a fastening means 8 is shown, by means of which the belt suspension means 6 is fastened to the backrest 3. The fastening means 8 provides on the side of the belt suspension means a mounting device 9 and on the side of the backrest a retention device 10 for the mounting device 9. A receiving means 11 for a belt reversal bracket 12 is positioned substantially centrally on the mounting device 9.

According to the invention a crash element 13, which in this embodiment comprises an upper deformation element 14 and a lower deformation element 15, is arranged between the mounting device 9 and the retention device 10. The two deformation elements 14 and 15 have in each case a sheet-like base member 16 and 17 respectively bent substantially into a U shape. The crash element 13 in this embodiment is preferably a plastically deformable crash element 13.

The sheet-like base members 16 and 17 respectively are designed in this embodiment in such a way that they form deformation regions 18 (numbered here only by way of example in each case) for the reduction of kinetic energy with respect to an activation of the belt retention apparatus 4 as a result of an accident.

In the event of an activation of the belt retention apparatus 4 as a result of an accident the multiple of the body weight of a person acts upon the locked belt 5 and, in particular upon the belt suspension means 6, by way of which corresponding restraining forces are frequently introduced in an abrupt manner into a structure 19 of the backrest 3.

The high position of the belt suspension means 6 at the top on the left 4 on the backrest 3 leads to a relatively high loading, in particular on an adjustment mechanism 20 between the seat part 2 and the backrest 3, since the restraining forces introduced on the belt suspension means 6 act in an additionally amplified manner upon the adjustment mechanism 20 by a lever path 21 between the belt suspension means 6 and the adjustment mechanism 20.

In an advantageous manner the restraining forces can be reduced at least in part by deformation action carried out at the crash element 13, before they can act upon the retention device 10 of the backrest structure 19.

It is particularly advantageous, however, for the crash element 13 to have a direction of main deformation 22 substantially in the direction of a longitudinal extension 23 of the backrest. In particular, on account of this feature, the lever path 21 between the belt suspension means 6 and the adjustment mechanism 20 can be shortened in an advantageous manner as soon as the crash element 13 is deformed as a result of an accident. In an advantageous manner, this in turn has the consequence that lower forces or moments act upon the adjustment mechanism 20, as a result of which the risk of irreparable damage to the adjustment mechanism 20 is substantially reduced. In this case even short deformation paths of less than 50 mm are sufficient to cause an effective release of the adjustment mechanism 20. In this respect the crash element 13 embodies not only a device for the reduction of kinetic energy but also, in particular, a device 24 for the reduction of the lever path 21.

In addition, the crash element 13 is characterized by two abutment planes 25 and 26 (numbered only at the sheet-like base member 16 by way of example) which are at a distance from each other and which are spaced from each other by a rib structure 27 (numbered only at the sheet-like base member 17 by way of example). The first abutment plane 25 is used for fastening to the mounting device 9 and the second abutment plane 26 is used for fastening to the retention device 10. In this embodiment the fastening means 8 is designed in the form of a welded structure, as a result of which the crash element 13 can be integrated into the structure of the vehicle seat or into the backrest structure 19 in a very inexpensive manner.

The rib structure 27 is at a right angle a with respect to the two abutment planes 25 and 26 (see in particular also FIG. 9) and it preferably extends substantially horizontally. In this respect the rib structure 27 is orientated substantially transversely to the direction of main deformation 22.

In order to be able to provide a sufficiently long deformation path in the direction of the direction of main deformation 22 if required, the crash element 13 comprises a store of material 28 which extends at least in part behind the second abutment plane 26 or behind a plane of the retention device. To this end, the sheet-like base members 16 and 17 of the crash element 13 traverse the retention device 10 through corresponding openings 29 (numbered here only by way of example in FIG. 1).

The further crash element 113 shown in FIGS. 4 and 5 has a rib structure 127 with four individual webs 130 (numbered here only by way of example) which are made straight and are welded orientated in their original position (see FIG. 4), preferably at a right angle between a mounting device 109 of a belt suspension means 106 and a retention device 110 of a backrest 103.

In order to stabilize further the crash element 113 and to orientate the four straight individual webs 130 in a simpler manner during the production of the crash element 113, offsets 131 in the form of a thickening of material are provided on the mounting device 109. In this alternative embodiment the crash element 113 comprises at the same time the mounting device 109 and the retention device 110 and is thus particularly compact in design.

While the crash element 113 is still situated in its original position in the illustration according to FIG. 4, in accordance with the illustration according to FIG. 5 it is deformed in its direction of main deformation 122 on account of an activation of a belt retention apparatus (not shown here) as a result of an accident. In this case it is clearly evident that the individual webs 130 are inclined and the mounting device 109 has shifted with respect to the retention device 110 by a deformation path 132. Here, it allows for deformation action to be carried out on the one hand and for a lever path between a belt suspension means and an adjustment mechanism to be advantageously shortened on the other hand.

In the embodiment shown in FIG. 6, a crash element 213 has two sheet-like base members 216 and 217 which are bent into a U shape and which connect a mounting device 209 and a retention device 210 to each other at a distance. The crash element 213 has a rib structure 227 and has a first abutment plane 225 on the side of the mounting device and a second abutment plane 226 at a distance from it on the side of the retention device. The first abutment plane 225 is formed by a flat partial region 235 which rests against the mounting device 209 and is welded to it. The second abutment plane 226 is formed by end fastening plates 236 (numbered only by way of example) which rest against the retention device 210 and are welded there.

According to the deformation sequence 237 shown in FIG. 6, the crash element 213 is deformed and performs advantageous deformation action on the one hand and provides an advantageous deformation path 232 on the other hand, in order to shorten a lever path between a belt suspension means and a displacement mechanism, as has already been described above. In this embodiment the mounting device 209 always moves closer to the retention device 210 in the course of the deformation sequence 237 and an original structural height 238 of the crash element 213 is reduced in succession. In this respect it is advantageous for the structural height 238 of the crash element 213 also to be selected with a view to the necessary deformation path 232.

The embodiments shown in FIG. 7 show, on the left-hand side, a crash element 313 with a sheet-like base member 316 which is bent substantially into a U shape and which holds a store of material 328 on one 340 of its arms 340, 341. In this case the store of material 328 is designed conversely in a U shape and is housed inside the arm 340 between a first abutment plane 325 and a second abutment plane 326 of the crash element 313.

On the right-hand side the embodiments show a crash element 413 which corresponds to the design of the crash element 213. In this respect, reference is made to the description of FIG. 6, in order to avoid repetition. The two crash elements 313 and 413 are shown between a plane 342 on the side of the belt suspension means and a plane 343 on the side of the backrest.

The further crash elements 513, 613 and 713 illustrated in FIG. 8 display further variants of how a crash element can be designed and orientated in a belt suspension fastening means with respect to the plane 342 on the side of the belt suspension means and a plane 343 on the side of the backrest. The crash elements 513 and 613 have a simple U shape. The crash element 613 is inserted rotated through 90°. In contrast, the crash element 713 has a sheet-like base member 716 bent into an S shape.

The fastening means 808 shown in FIG. 9 substantially corresponds to the embodiment according to FIG. 6. A sheet-metal rib angle a of 90° is indicated with respect to a first sheet-like base member 816 of a crash element 813 of the fastening means 808, in which case the crash element 813 is welded to a mounting device 809 on the side of the belt suspension means and a retention device 810 on the side of the backrest. Depending upon the deformation path required (see reference number 232, FIG. 6), the sheet-metal rib angle a can also be selected with a different value, as has already been described in the introduction.

It is to be understood that the embodiments described above are merely first arrangements of the invention. In this respect the arrangement of the invention is not restricted to these embodiments. All the features disclosed in the application documents are claimed as being essential to the invention, insofar as they are novel either individually or in combination as compared with the prior art.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A belt retention apparatus integrated on a vehicle seat having a seat part and a backrest, comprising:
   a belt suspension means;
   a fastening means configured to fasten the belt suspension means to the backrest; and
   a crash element associated with the fastening means having a deformation region for reducing kinetic energy in the event of activation of the belt retention apparatus as a result of an accident,
   wherein the crash element comprises a base member having at least one sheet metal rib and at least two abutment planes separated from each other, wherein the at least one sheet metal rib is orientated substantially horizontally.

2. The vehicle seat according to claim 1, wherein the deformation region has a direction of main deformation along a longitudinal extension of the backrest.

3. The vehicle seat according to claim 1, wherein the base member is configured with at least one bend.

4. The vehicle seat according to claim 1, wherein
   the belt suspension means comprises a mounting device for mounting on the backrest; and
   the backrest comprises a retention device for retaining the mounting device on the backrest,
   wherein the crash element is arranged between the mounting device and the retention device.

5. The vehicle seat according to claim 4, wherein the crash element further comprises a store of material for extending a deformation path within the deformation region, wherein the store of material is arranged at least in part behind at least one of a plane of the mounting device or a plane of the retention device.

6. The vehicle seat according to claim 1, wherein the at least one sheet metal rib is at an angle of between 10° and 170° with respect to at least one of the abutment planes.

7. The vehicle seat according to claim 6, wherein the at least one sheet metal rib is at an angle of between 20° and 160° with respect to at least one of the abutment planes.

8. The vehicle seat according to claim 7, wherein the at least one sheet metal rib is at an angle of 90° with respect to at least one of the abutment planes.

9. A belt retention apparatus integrated on a vehicle seat having a seat part and a backrest, comprising:
- an adjustment mechanism arranged between the seat part and the backrest;
- a belt suspension means having a device for mounting on the backrest;
- a mounting device for mounting the belt suspension means to the backrest;
- a retention device for the retention of the mounting device, wherein the mounting device is arranged on the retention device; and
- a restriction device for shortening a lever path between the belt suspension means and the adjustment mechanism in the event of activation of the belt retention apparatus as a result of an accident.

\* \* \* \* \*